United States Patent
Kienzle et al.

(10) Patent No.: US 11,878,944 B2
(45) Date of Patent: Jan. 23, 2024

(54) CERAMIC COMPONENT

(71) Applicant: SGL CARBON SE, Wiesbaden (DE)

(72) Inventors: Andreas Kienzle, Meitingen (DE);
Dominik Rivola, Meitingen (DE);
Oswin Oettinger, Meitingen (DE);
Blasius Hell, Meitingen (DE); Philipp Modlmeir, Meitingen (DE)

(73) Assignee: SGL CARBON SE, Wiesbaden (DE)

( * ) Notice: Subject to any disclaimer, the term of this patent is extended or adjusted under 35 U.S.C. 154(b) by 0 days.

(21) Appl. No.: 16/650,116

(22) PCT Filed: Sep. 28, 2018

(86) PCT No.: PCT/EP2018/076547
§ 371 (c)(1),
(2) Date: Mar. 24, 2020

(87) PCT Pub. No.: WO2019/063833
PCT Pub. Date: Apr. 4, 2019

(65) Prior Publication Data
US 2020/0308063 A1 Oct. 1, 2020

(30) Foreign Application Priority Data

Sep. 28, 2017 (DE) ..................... 10 2017 217 321.1

(51) Int. Cl.
*C04B 35/565* (2006.01)
*B28B 1/00* (2006.01)
(Continued)

(52) U.S. Cl.
CPC ............ *C04B 35/565* (2013.01); *B28B 1/001* (2013.01); *B33Y 70/00* (2014.12); *B33Y 80/00* (2014.12);
(Continued)

(58) Field of Classification Search
CPC .... C04B 35/573; C04B 41/0018; C04B 41/81
See application file for complete search history.

(56) References Cited

U.S. PATENT DOCUMENTS 3,649,342 A * 3/1972 Bartlett ................ C04B 35/565
428/357
3,951,587 A * 4/1976 Alliegro ................ C04B 35/573
432/253
(Continued)

FOREIGN PATENT DOCUMENTS

DE 10 2013 017 193 A1 4/2015
EP 2 998 282 A1 3/2016

OTHER PUBLICATIONS

International Search Report dated Dec. 17, 2018 in corresponding International application No. PCT/EP2018/076547; 5 pages.
(Continued)

*Primary Examiner* — Karl E Group
(74) *Attorney, Agent, or Firm* — Maier & Maier, PLLC

(57) ABSTRACT

A ceramic component containing silicon carbide and to the use of the component. The method for producing the ceramic component includes the following steps: a) providing a green body based on SiC, which has been produced by means of a 3D-printing method, b) impregnating the green body with a solution selected from the group consisting of a sugar solution, a starch solution or a cellulose solution, or a resin system comprising a mixture containing at least one resin, at least one solvent and at least one curing agent, the at least one resin and the at least one solvent being different, c) drying or curing the impregnated green body, d) carbonising the dried or cured green body, wherein a fine-pored, foam-like carbon skeleton is produced from the dried solution or a fine-pored, sponge-like carbon skeleton is produced from the cured resin system.

15 Claims, 2 Drawing Sheets

(51) Int. Cl.
*B33Y 70/00* (2020.01)
*B33Y 80/00* (2015.01)

(52) U.S. Cl.
CPC .............. *C04B 2235/3821* (2013.01); *C04B 2235/422* (2013.01); *C04B 2235/428* (2013.01); *C04B 2235/616* (2013.01); *C04B 2235/665* (2013.01); *C04B 2235/74* (2013.01)

(56) References Cited

U.S. PATENT DOCUMENTS

| | | | | |
|---|---|---|---|---|
| 6,347,446 | B1* | 2/2002 | Luthra | C04B 35/62844 29/402.18 |
| 6,695,984 | B1* | 2/2004 | Odaka | C04B 35/573 252/500 |
| 6,995,103 | B2* | 2/2006 | Aghajanian | C04B 35/563 109/49.5 |
| 2003/0109371 | A1* | 6/2003 | Pujari | C04B 35/5603 501/91 |
| 2006/0169128 | A1* | 8/2006 | Aghajanian | C04B 35/62625 89/36.02 |
| 2009/0130435 | A1* | 5/2009 | Aghajanian | C04B 35/573 428/331 |
| 2010/0279007 | A1 | 11/2010 | Briselden et al. | |
| 2013/0168905 | A1* | 7/2013 | Anderson | C04B 35/563 264/643 |
| 2016/0016807 | A1* | 1/2016 | Bracamonte | C01B 32/984 423/345 |
| 2016/0083300 | A1 | 3/2016 | Ide et al. | |
| 2016/0272548 | A1* | 9/2016 | Lynen | C04B 38/0038 |

OTHER PUBLICATIONS

Stevinson, et al., "Support-Free Infiltration of Selective Laser Sintered (SLS) Silicon Carbide Preforms", The University of Texas at Austin, 2006, pp. 359-365; URL: http://sffsymposium.engr.utexas.edu/Manuscripts/2006/2006-33-Stevinson.pdf; 7 pages.

Stevinson, et al., "Freeform Fabrication of Non-Metallic Objects by Selective Laser Sintering and Infiltration", Materials Science Forum, 2007; 4 pages.

* cited by examiner

Prior Art

CERAMIC COMPONENT

FIELD

The disclosure relates to a ceramic component containing silicon carbide, and to the use of the component.

Silicon carbide ceramic is generally characterised by its high hardness, good resistance to abrasion, high chemical stability, high strength even at high temperatures, and good temperature resistance alongside low thermal expansion with high thermal conductivity. One way to produce this ceramic is to provide a slurry of silicon carbide (SiC), carbon or a resin as carbon source and suitable excipients, to form this slurry into a green body, to dry the green body, and to siliconise the dried green body with liquid silicon. The carbon or the carbon source is necessary in order to ensure a sufficient wetting of the used silicon carbide with liquid silicon. The carbon or the carbon source reacts at this time with silicon, and silicon carbide is formed. Normally, a composite material is obtained by a method of this kind and contains, in addition to SiC, also free silicon and a very small amount of unreacted carbon, or what is known as free carbon. Such a composite material is typically referred to as an Si/SiC composite material. The terms "free silicon" and "free carbon" are understood in this context to mean the elements in their pure form, which are not chemically bonded, but only bonded to themselves. In a composite material of this kind the silicon carbide and the free carbon are inert components, whereas the free silicon is the least stable component chemically and thermally and is unable to withstand attacks for example from hydrofluoric acids or hot lyes, such as hot NaOH or hot KOH—in contrast to the free carbon and the silicon carbide. Since the free silicon is meltable, the usage temperature of the Si/SiC composite material is additionally limited to a temperature below the melting point of silicon, which is 1414° C. The free carbon in such a composite material may indeed be attacked in principle by oxidising media, however the carbon is encased with an SiC sleeve as a result of the liquid siliconisation and is thus protected.

Components made from silicon carbide ceramic which have a complex, geometric structure are not producible by simple mechanical processing due to the high hardness of the ceramic. Such components can be produced by means of an additive manufacturing method, such as laser sintering or 3D printing (binder jetting method).

With the laser sintering method, it is indeed possible to produce complex, geometric structures, however the method speeds are very slow in comparison to the 3D-printing method. This slower method speed results in higher production costs. In addition, the laser sintering method is more complex than the 3D-printing method. Since, in the laser sintering method, there is additionally a higher heat input, in comparison to the 3D-printing method a more inhomogeneous temperature field is present, which may lead to a warping of the component made of silicon carbide ceramic. In addition, the laser sintering method may lead to a high shrinkage due to the sintering. This makes support structures necessary, which makes this method more complex again due to the post-processing. There is practically no shrinkage in the case of the green bodies produced by the binder jetting method, and no support structures are needed. A further disadvantage of laser sintering is that when binder-solid mixtures in powder form are used to produce the green bodies, there is a fundamental risk that these mixtures will segregate. This risk of segregation might not occur in the case of binder jetting, whereby a better homogeneity of the produced green body is achieved.

In DE 10 2013 017 193 A1 a ceramic composite material is produced with use of a silicon carbide and/or boron carbide having a certain grain size and a binder by means of the 3D-printing method. The resultant shaped body based on silicon carbide and/or boron carbide is then impregnated at least once with a carbon black suspension, before a siliconisation is performed. The impregnating solution adheres to the silicon carbide and/or boron carbide particles, and large, empty pores remain between these particles. In order to reduce the content of free silicon in the composite material, it is necessary to perform a multiple impregnation with a carbon black dispersion. However, relatively large, empty pores still remain between the particles in spite of multiple impregnation and are filled with free silicon following the subsequent siliconisation. The Si/SiC composite material thus produced has an inhomogeneous microstructure composition, which comprises relatively large lakes or regions of free silicon.

BACKGROUND

Due to the inhomogeneous microstructure composition, in particular the presence of large lakes or regions of free silicon, the chemical stability, in particular with respect to acids or hot lyes, for example hydrofluoric acid or hot NaOH lye, and the temperature resistance of the ceramic composite materials containing silicon carbide are reduced.

SUMMARY

The object of the disclosure is therefore to provide a homogeneous, ceramic component containing silicon carbide which, besides a high hardness, a high strength, and a good resistance to abrasion, also has a high chemical stability and a good resistance to temperature. In addition, this component should be suitable to be produced quickly, easily and economically with practically unlimited geometric complexity.

Within the scope of the present invention this object is achieved by providing a ceramic component containing silicon carbide (SiC) obtainable by a method comprising the following steps:
  a) providing a green body based on SiC which has been produced by means of a 3D-printing method,
  b) impregnating the green body with a solution selected from the group consisting of a sugar solution, a starch solution or a cellulose solution, or a resin system comprising a mixture containing at least one resin, at least one solvent and at least one curing agent, the at least one resin and the at least one solvent being different,
  c) drying or curing the impregnated green body,
  d) carbonising the dried or cured green body, wherein a fine-pored, foam-like carbon skeleton is produced from the dried solution or a fine-pored, sponge-like carbon skeleton is produced from the cured resin system,
  e) siliconising the carbonised green body by infiltrating with liquid silicon.

In accordance with the invention, it has been identified that if a solution as described above or a resin system comprising at least one resin, at least one solvent and at least one curing agent, the at least one resin and the at least one solvent being different, is used for impregnation of the green body based on silicon carbide, in the event of carbonisation of the dried or cured green body, a fine-pored, foam-like or sponge-like carbon skeleton is produced from the cured, fine-pored, foam-like solution or the sponge-like, fine-pored resin system. Where the term "sponge-like carbon skeleton" is used hereinafter, this term thus also stands for a foam-like carbon skeleton. In the event of siliconisation of such a green body, the pores of the green body are filled with silicon, whereby the pore volume of the sponge-like carbon skeleton is filled practically fully with silicon carbide. As a result of this filling of the pores, the proportion of relatively large lakes or regions of free silicon is significantly reduced as compared to the prior art, as can be seen on the basis of FIG. 2. The free silicon is therefore no longer present in the form of large lakes or regions, and instead silicon carbide structures are present in these pores. The presence of these silicon carbide structures which fill the pores leads to a higher chemical stability and to a greater temperature resistance of the ceramic component and to improved mechanical properties. It is crucial when using a resin system for impregnation of the green body that the at least one resin and the at least one solvent are different. If the at least one resin and the at least one solvent are identical, the carbonisation of the cured green body based on carbon does not result in a fine-pored, sponge-like carbon skeleton, but instead a compact resin carbon form. During the siliconisation, this results in the fact that the carbonised resin carbon can be converted into SiC only at the surface, and a majority of the inside of the resin carbon remains as carbon due to the inaccessibility to silicon, whereby the SiC content is only slightly increased by comparison (see FIG. 1).

The green body based on silicon carbide in step a) is produced by means of a 3D-printing method. In this case, SiC powder with a grain size (d50) between 50 μm and 500 μm, preferably between 60 μm and 350 μm, more preferably between 70 μm and 300 μm, particularly preferably between 75 μm and 200 μm, and a liquid binder are provided. A layer of the powder is then deposited areally, followed by a local deposition of drops of the liquid binder onto this layer. These steps are repeated until the desired form of the component is produced, the individual steps being matched to the desired form of the component. The binder is then at least partially cured or dried, resulting in the green body having the desired form of the component. The term "d50" is understood to mean that 50% of the particles are smaller than the specified value. The d50 value was determined with the aid of a method based on laser granulometry (ISO 13320), and a measurement apparatus from the company Sympatec GmbH with associated analysis software was used.

Obtaining a green body having the desired form of the component is understood to mean the following Immediately after the curing or drying of the binder, the green body is still surrounded by a powder bulk formed of loose particles of the powdery composition. The green body must therefore be removed from the powder bulk or separated from the loose, non-solidified particles. This is also referred to in the literature relating to 3D printing as an "unpacking" of the printed component. The unpacking of the green body may be followed by a (precision) cleaning of the green body in order to remove adhering particle residues. The unpacking may be performed for example by sucking up the loose particles using a high-performance sucker. The manner in which the unpacking is performed, however, is not particularly limited, and all known methods may be employed.

When producing the green body, it may be advantageous that the silicon carbide is mixed with a liquid activator, such as a liquid sulfuric acid activator. Due to the use of an activator of this kind, the curing time and the necessary temperature for the curing of the binder may be reduced on the one hand, and on the other hand the development of dust by the powdery composition is reduced. The amount of activator is advantageously 0.05 wt. % to 0.2 wt. % in relation to the total weight of SiC and activator. If more than 0.2 wt. % in relation to the total weight of activator and SiC are used, the powdery composition clumps together and the pourability is reduced; if less than 0.05 wt. % in relation to the total weight of SiC and activator are used, the amount of activator that can react with the binder, more specifically the resin fraction of the binder, is too low to achieve the desired above-mentioned advantages.

The choice of the binder for production of the 3D-printed green body is not particularly limited, Suitable binders are, for example, phenol resins, furan resins, polyimides, celluloses, starches, sugars, silicates, silicon-containing polymers, water glass, pitch, polyacrylonitrile (PAN) or any mixtures thereof. Solutions of the aforesaid binders are also included herein. In principle, the binders should be such that, following the carbonisation, stable bodies can be obtained, which withstand the handling when transferred into the siliconisation apparatus, as well as the temperature applied during the siliconisation. The binder should either have a sufficiently high carbon yield or a Si-containing inorganic yield when using Si-organic binders following the pyrolysis. When choosing thermoplastic binders such as pitch, it may be necessary to carbonise the entire powder bed in order to break it down and thus ultimately crosslink it. The same is true for PAN. The powder bed without binder additive acts here as a support for the component whilst the thermoplastic binder such as pitch or PAN is carbonised. In addition, the powder bed advantageously acts as protection against oxidation for the printed green body during the subsequent carbonisation treatment.

The binders constituted by phenol resins, furan resins or polyimides are resins and polymers with a relatively high carbon yield. They belong to the class of binders that are transferred by curing into a non-meltable binder system and with siliconisation are converted largely into SiC. Due to its high carbon yield, not all carbon is usually converted with siliconisation into SiC, and carbon inclusions are produced, which leads to a lighter component as a whole. Furthermore, the high carbon yield causes the content of free silicon in the component to be lower, accordingly, which leads to an improved chemical stability and a higher temperature resistance.

Celluloses, starches or sugars, preferably present in the form of a solution, may also be used, however, as binders. These binders only have to be dried, which is economical, and the carbon residue created with the carbonisation converts with the siliconisation ideally, that is to say substantially completely, into SiC.

The use of silicates, water glass or silicon-containing polymers as binder, preferably present in the form of a solution, also has the advantage that these binders also only have to be cured. They form SiC of their own accord during the carbonisation. The wetting with liquid Si is also better than in the case of carbon, which facilitates the step of siliconisation.

The proportion of the binder in the green body is preferably 1.0 to 35.0 wt. %, preferably 1.0 to 10.0 wt. %, and most preferably 1.5 to 5.0 wt. %, in relation to the total weight of the green body.

In a further preferred embodiment of the present invention, the green body according to step a) contains, besides silicon carbide, also boron carbide ($B_4C$), and this green body preferably contains up to 50 wt. % $B_4C$ in relation to the total weight of the green body. The used $B_4C$ is used in the form of a powder which preferably has a grain size (d50) between 50 µm and 500 µm, preferably between 60 µm and 350 µm, more preferably between 70 µm and 300 µm, particularly preferably between 75 µm and 200 µm. In order to determine the d50 value, the method based on laser granulometry (ISO 13320) was used here as well, and a measurement apparatus from the company Sympatec GmbH with associated analysis software was used.

Due to the use of $B_4C$ powder in the production of the green body, the hardness of the ceramic component produced therewith is increased, and the weight of the component is reduced.

In order to produce a green body which, besides silicon carbide, also contains boron carbide, the 3D-printing method described above for silicon carbide may also be applied, wherein, instead of SiC a mixture of SiC and $B_4C$ is used for the step of the areal deposition.

Within the scope of the invention, the impregnation of the green body according to step b) is performed with a solution or a resin system. The solution may be a sugar solution, preferably a monosaccharide solution, a polysaccharide solution or a mannitol solution, a starch solution, or a cellulose solution.

It is assumed that these solutions, if they are dried, lead during the carbonisation to a foam-like carbon skeleton. A drying occurs if the above-mentioned solutions are used for the impregnation. With use of a resin system for the impregnation of the green body, the step of curing occurs after the impregnation.

The use of such a solution for the impregnation has the benefit that these solutions do not require any pot life times.

If a resin system is used for the impregnation of the green body in accordance with step b), a phenol resin, a furan resin, or any mixture of a phenol resin with a furan resin is preferably used.

In the case of a resin system, the at least one solvent is preferably selected from the group consisting of water, a monovalent or polyvalent alcohol, a mixture of at least two of the aforesaid alcohols, a mixture of water with at least one monovalent and/or polyvalent alcohol or naphthalene. For example, methanol, ethanol, propanols (n-propanol, isopropanol) or butanols, for example n-butanol or sec-butanol, preferably ethanol, can be used as monovalent alcohols; for example, the divalent alcohol glycol or the trivalent alcohol glycerol may be used as polyvalent alcohols, for example.

It is assumed that, during the curing step, the solvent is incorporated into the resin system in the form of fine droplets of homogeneous size, and then escapes during the carbonisation step, wherein empty, i.e. unfilled pores, are formed and provide a kind of sponge structure within the pores of the green body. Consequently, the pores likewise have a homogeneous size, which is advantageous in respect of the subsequent homogeneous conversion of the amorphous carbon in silicon carbide. A fine-pored, sponge-like carbon skeleton is thus produced from the cured resin system. The pores of the sponge-like carbon skeleton preferably have a mean pore size of less than 50 µm, more preferably of less than 20 µm, particularly preferably of less than 10 µm, and very particularly preferably of less than 5 µm. The mean pore size may be determined for example by a quantitative structural analysis under a light microscope or a scanning electron microscope. As a result of this formation of pores, the accessible surface of the carbon skeleton produced from the cured resin system is significantly increased, which ensures that the liquid silicon may fill these pores fully to a large extent in accordance with step e). The accessible surface of the carbon skeleton is all the greater, the smaller the mean pore size. Since the carbon of the aforesaid carbon skeleton reacts quickly with the liquid silicon, this carbon may be converted to the greatest possible extent into silicon carbide. At the same time, the original pores of the green body are filled to the greatest possible extent by the sponge structure, whereby the lakes or regions of free silicon are significantly reduced with the subsequent silicon infiltration.

The resin system used for the impregnation of the green body in accordance with step b) preferably comprises, as curing agent, an inorganic or organic acid, preferably an acid selected from the group consisting of diluted sulfuric acid, hydrochloric acid, phosphoric acid, boric acid, oxalic acid, maleic acid anhydride, citric acid, malic acid, benzenesulfonic acids or phenolsulfonic acids, more preferably benzenesulfonic acids or phenolsulfonic acids, particularly preferably para-toluene sulfonic acid. Here, a curing agent is understood to be a chemical compound which causes the curing of the used resin.

In accordance with a further preferred embodiment of the present invention, it is possible that the at least one solvent is replaced by at least one propellant. The at least one propellant is advantageously selected from the group consisting of halogenated hydrocarbons, preferably trichlorotrifluoroethane, pentanes, preferably n-pentane, isopentane and cyclo-pentane, or tin chloride. The resin system for impregnation of the green body in accordance with step b) may also comprise a mixture of one of the above-mentioned curing agents and one of the mentioned propellants. In the case of the use of at least one propellant in the resin system, a two-component resin, preferably a polyurethane resin or an isocyanate resin, may be used as at least one resin.

In accordance with a further preferred embodiment of the present invention, the impregnated green body may be cured in step c) at room temperature or under application of a temperature that is lower than the boiling point of the used solvent or the solvent mixture, the curing preferably being performed at room temperature. The curing at room temperature is preferred, since there is no need for the temperature application, thus constituting a more economical method step. This curing at room temperature is made possible since the resin system comprises a curing agent. Furthermore, the speed of the curing may be controlled in a targeted manner by the proportion of curing agent that is added. It is sought here to achieve a curing time in a range of from 10 minutes to 10 hours. This adjustable curing time is directed here towards the desired processing times. After the curing, the used resin is not meltable and therefore may be carbonised. A further advantage of the curing at room temperature lies in the fact that a temperature application leads to a temporary reduction of the resin viscosity and therefore to the discharge of the resin from the pores of the green body. Such a discharge on the one hand results in a loss of resin, and on the other hand the green body may lose its form since parts of the resin adhere undesirably to the lower part of the green body in the manner of an "elephant's foot".

The term "carbonisation" according to step d) is understood to mean the thermal conversion of the resin system contained by the green body into carbon. The carbonisation may occur by heating to temperatures in a range of from 500° C.-1100° C., preferably from 800° C. to 1000° C., in an inert gas atmosphere (for example in an argon or nitrogen atmosphere) with subsequent hold time. In view of the solvent contained in the pores, it is advantageous if the heating to the carbonisation temperature is performed gently, since this contained solvent (mostly water) first has to be expelled. If this expulsion is not performed slowly or gently, the green body may explode.

The siliconisation of the carbonised green body with liquid silicon in accordance with step e) may take place in principle in an inert gas atmosphere (for example Ar or He), at positive pressure, normal pressure, or in a vacuum, preferably under vacuum. For the generation of delicate and complex structures, such as undercuts, cavities or cooling channels, it is necessary that the liquid silicon may infiltrate the carbonised green body by itself, solely by means of capillary forces. The present carbonised green bodies have precisely this desired property, i.e. that the pore system of the carbonised green bodies may be constructed by means of the 3D-printing method in such a way that, without additional supply of pressure, the green body is infiltrated with silicon fully and practically without pores, purely by capillary forces. In addition, in the cooling process following the infiltration, the liquid silicon does not run out again, additionally to the conventional method in which silicon is pushed out on the basis of the change in density of silicon. The infiltration of the carbonised green body with liquid silicon functions particularly well in a vacuum, since the carbon is thus better wetted by the silicon and the absorption behaviour of the green body is improved. Furthermore, the siliconisation in a vacuum may be performed at a lower temperature, and this temperature must lie naturally above the melting point of silicon. The above step e), i.e. the siliconisation, therefore takes place preferably under vacuum. The liquid silicon referred to in this context, within the scope of the present invention also comprises silicon alloys having a silicon fraction of at least 50 wt. %. Pure silicon, however, is preferably used.

In step e), siliconisation, the green body to be siliconised lies preferably on wicks which protrude from a bath of the silicon melt. The wicks, similarly to the green body itself, are able to conduct the liquid silicon through their porous structure by means of capillary forces. The green body itself does not dip into the silicon bath, but instead is situated above the bath. Once the siliconisation and cooling to room temperature are complete, the wick is connected to the component by the solidified silicon and therefore has to be mechanically removed. In order to simplify the method according to the invention even further, the wicks are preferably already provided as part of the green body, i.e. they are "printed on" to the green body at the time of production of the green body by means of 3D printing. The green body may thus be introduced easily into the container provided for the silicon bath, with the wicks pointing downwardly. Once the siliconisation and cooling are complete, the wicks are mechanically removed, as before.

Within the scope of the present invention, it is also possible that steps d) and e), i.e. the carbonisation and the subsequent siliconisation of the cured, impregnated green body, are performed practically in a single method step, because, with the siliconisation, the green body also carbonises already during the heating to the siliconisation temperature—in situ so to speak.

In accordance with yet a further preferred embodiment of the present invention, following the carbonisation in accordance with step d), the steps of impregnation in accordance with step b), of drying or curing in accordance with step c), and of carbonisation in accordance with step d) may be repeated at least once in the stated order, before the siliconisation in accordance with step e) is performed. Due to these additional steps, the pores of the green body skeleton are filled even more completely with the fine-pored sponge-like carbon skeleton produced by the carbonisation of the cured resin system. Due to the higher proportion of this sponge-like carbon skeleton, the carbon fraction that is converted into SiC during the subsequent siliconisation is further increased, which causes the SiC fraction of the ceramic component to be further increased, and the fraction of free silicon in this component advantageously to be reduced at the same time.

The first impregnation is advantageously performed with a resin system, and the second impregnation with a sugar solution, starch solution or cellulose solution. Due to the first impregnation step, a fine-pored, sponge-like carbon skeleton is produced after the carbonisation, however it does not fully fill the pores between the SiC grains, since the resin sponge undergoes a shrinkage during its carbonisation. Since a sugar solution, starch solution or cellulose solution is used in the second impregnation step and forms a foam-like carbon skeleton during the carbonisation, the remaining pore spaces between the SiC grains are practically completely filled. The carbon fraction that is converted into SiC during the subsequent siliconisation is hereby further increased, and therefore the proportion of free silicon in the ceramic component is reduced. Furthermore, the density of the ceramic component is increased by this second impregnation step.

Due to the lower content of free silicon, the chemical resistance and the temperature resistance of the ceramic component are increased, and the hardness, rigidity and strength of the ceramic component is increased by the higher content of silicon carbide.

Due to this formation of pores, the accessible surface of the carbon skeleton produced from the cured resin system is significantly increased, which ensures that the liquid silicon may fully fill out these pores to a large extent in accordance with step e). Since the carbon of the aforementioned carbon skeleton reacts quickly with the liquid silicon, this carbon may be converted to the greatest possible extent into silicon carbide.

Within the scope of the invention, it is also preferred that the following steps are performed at least once between steps a) and b):
  i) impregnating the green body with an impregnation means selected from the group consisting of phenol resins, furan resins, or pitch,
  ii) if necessary, curing the impregnated green body,
  iii) carbonising the green body from step i) or ii), with no fine-pored, sponge-like carbon skeleton being produced after the carbonisation.

A redensification of the green body occurs with these steps and leads to a higher strength of the carbonised body. A potential warping or tearing of the carbonised body during the siliconisation treatment may thus be minimised.

It is also possible that this redensification occurs by means of chemical gas-phase infiltration (=Chemical Vapour Infiltration=CVI). Hydrocarbon gases, such as methane or propane, are introduced here into the pores of the carbon body at high temperatures in the range of from 1000° C.-1300° C. and reduced pressure, and are broken down such that the carbon deposits on all pore walls, thus resulting in a more stable carbon body.

A further aspect of this invention relates to the method for producing a ceramic component containing silicon carbide (SiC) as described in the application.

The ceramic component according to the invention based on a green body whose production did not involve the use of any $B_4C$ powder, but instead exclusively SiC powder, contains 70 to 95 wt. %, preferably 72 to 90 wt. %, SiC, 2 to 27 wt. %, preferably 9 to 27 wt. %, free silicon, and less than 3 wt. %, preferably less than 1 wt. %, free carbon. The proportion of free silicon, of free carbon, and of silicon carbide in the ceramic components was determined in accordance with DIN EN ISO21068-2. The lower the proportion of free silicon, the higher the chemical stability and temperature resistance of the ceramic component. The proportion of free carbon plays a role in the oxidation resistance and stability of the ceramic component. The lower the carbon content, the higher the oxidation resistance and the stability of the ceramic component. A high proportion of free carbon, however, leads to a lower density and thus to a lighter ceramic component. In addition, a ceramic component having a high proportion of free carbon is less brittle. It is additionally assumed that the SiC, which encases the free carbon, increases the oxidation stability of the carbon.

The ceramic component according to the invention based on a green body whose production did not involve the use of any $B_4C$ powder preferably has a density of more than 2.85 g/cm$^3$, more preferably of more than 3.00 g/cm$^3$. The density is determined here by means of the Archimedes method according to DIN 51918.

The ceramic component according to the invention based on a green body whose production did not involve the use of any $B_4C$ powder additionally preferably has a universal hardness of at least 8,000 MPa, more preferably of at least 8,500 MPa, particularly preferably of at least 9,500 MPa, most preferably of at least 10,000 MPa. This component is thus extremely stable also in respect of wear or an impact and has projectile-shattering properties in the case of applications in the field of ballistic protection. The universal hardness was determined in accordance with DIN 50359-1.

The ceramic component according to the invention based on a green body whose production did not involve the use of any $B_4C$ powder additionally preferably has a strength of at least 80 MPa, more preferably of at least 100 MPa, particularly preferably of at least 120 MPa. This component is thus also sufficiently stable in view of the mechanical loading. The strength was determined in accordance with the 3-point flexural strength determination method according to DIN 51902.

The ceramic component according to the invention based on a green body whose production did not involve the use of any $B_4C$ powder has an open porosity of the component of at most 1.0%, preferably of at most 0.5%, more preferably of at most 0,1%. The open porosity was determined by means of the Archimedes method according to DIN 51918.

The three-dimensional, ceramic component according to the invention, regardless of whether or not $B_4C$ powder was used in the green body on which the component is based, is characterised by its electrical conductivity, its high chemical and mechanical stability and hardness, and its resistance to abrasion. A further aspect of the present invention is therefore the use of the three-dimensional, ceramic component according to the invention as an impeller and separating or rotary vane in pumps and compressors, as a pump housing, in particular in the chemical industry, as fittings in columns, as static mixer elements, as turbulators, as burner nozzles, as burner inserts, as a lining of burner walls, as an electrical contact, as electrical heating elements and bearing frames in high-temperature furnaces (in particular due to the good resistance to thermal shock) and as classifier impellers or classifier wheels for mills for classifying mixtures of particles having different grain sizes.

Furthermore, this ceramic component according to the invention is characterised by a good thermal conductivity and a high chemical stability, high temperature resistance and a high resistance to changes in temperature. Yet a further aspect of the present invention is therefore the use of the ceramic component according to the invention as a heat exchanger, as an element for heat exchangers, as a hot pressing tool, or as a heat sink in electronics, or as a cooling housing for light-emitting diodes or cameras.

The high rigidity, the low thermal expansion, and the good thermal conductivity makes the ceramic component according to the invention also particularly suitable for high-precision gauges, such as thread gauges, or precise optical structures as are used in the field of optics.

This ceramic component according to the invention is also characterised by its high mechanical hardness and resistance to abrasion. It is thus particularly suitable for use as a mechanically loaded component, such as a sliding element in bearings or hinges comprising plan bearings and mechanical seals, a cam in transmissions, a gearwheel, a slide plate and a guide pipe of flexible shafts, a piston and a piston sleeve, or of machining tools in the form of milling tools, drills, drill heads or indexable inserts. A further aspect of the present invention is therefore the use of the ceramic component according to the invention as a mechanically loaded component comprising the above mechanically loaded components.

Since the ceramic component according to the invention also has a high abrasion resistance, it is suitable as a friction element for couplings and brakes. A further aspect of the present invention is therefore also the use of the ceramic component according to the invention as a friction element for clutches and brakes.

The ceramic component according to the invention also has a high universal hardness and is therefore suitable for ballistic applications, preferably in the form of helmets, body armour, or protection structures of complex form, for example for sensors or for the protection of civil and military vehicles. A further aspect of the present invention is therefore also the use of the ceramic component according to the invention in ballistic applications, in particular in the form of the aforementioned applications.

The above-mentioned uses also relate to ceramic components containing silicon carbide which have been produced by means of the method described in the application.

BRIEF DESCRIPTION OF THE DRAWINGS

The present invention will be described in greater detail hereinafter on the basis of these explanatory, but non-limiting examples with reference to the drawings.

DETAILED DESCRIPTION

Figure 1:
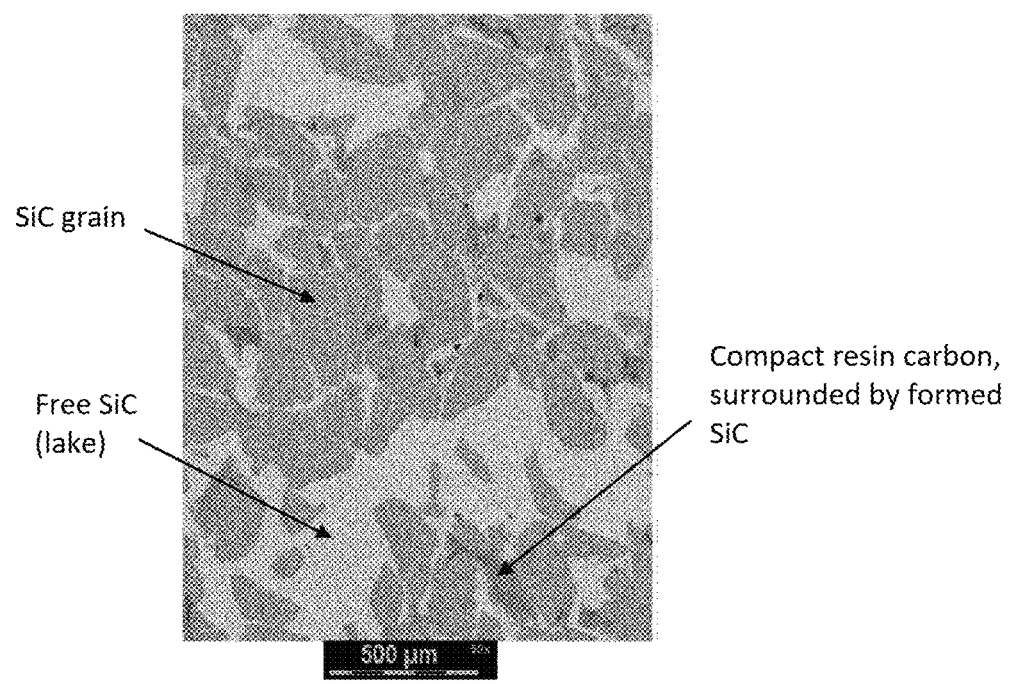
FIG. 1 shows a microsection of a ceramic component based on SiC, in which the green body has been impregnated with furan resin, cured, carbonised and siliconised.
Figure 2:
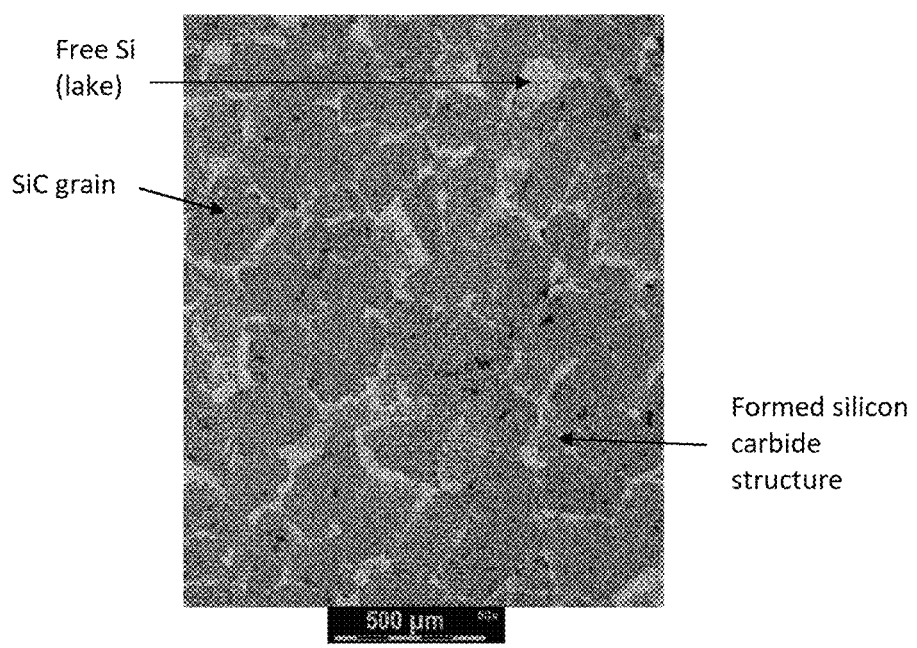
FIG. 2 shows a microsection of a ceramic component based on SiC which has been impregnated twice with a mixture of Norsophen 1203 (a phenol resin), water and para-toluene sulfonic acid, cured, carbonised and then siliconised.

FIG. 1 shows he microsection of a ceramic component based on SiC, the green body of which was produced by means of a 3D-printing method. This green body was impregnated once with furan resin (10 parts furfuryl alcohol, 1 part maleic acid anhydride), cured, carbonised and siliconised. In the resin system, the furfuryl alcohol has the function of the resin itself and at the same time the function as a viscosity-reducing solvent. The maleic acid anhydride acts as a curing agent. Before the carbonisation, the resin was cured at 160° C. As can be seen on the basis of the microsection, large lakes or regions of free silicon are present.

The large lakes or regions of free silicon may be filled with silicon carbide if the green body is impregnated with a resin system comprising a mixture containing a resol resin (phenol resin) with the trade name Norsophen 1203, water as solvent (and for reducing the viscosity), and para-toluene sulfonic acid (dissolved in water) as curing agent, and is cured and carbonised. The webs between the pores of the sponge-like carbon skeleton are converted into silicon carbide after the siliconisation. Here, there are no large lakes or regions of free silicon present, and instead these lakes or regions are filled with silicone carbide structures, such that only strands of free silicon are still present in multiples. This leads to a more homogeneous microstructure composition of the ceramic component.

EXAMPLES

The green body based on silicon carbide may be produced in accordance with step a) of the method according to the invention as described below.

A silicon carbide with grain size F80 (grain size according to FEPA standard) was used. This was firstly mixed with 0.1 wt. % of a liquid sulfuric acid activator for phenol resin, in relation to the total weight of silicon carbide and activator, and was processed by means of a 3D printing powder bed machine. A doctor blade unit applied a silicon carbide powder layer (approximately 0.3 mm high) to a planar powder bed, and a kind of inkjet printing unit printed an alcoholic phenol resin solution onto the silicon carbide powder bed in accordance with the desired component geometry. The printing table was then lowered by the layer thickness, and another layer of silicon carbide was applied, and phenol resin was again printed on locally. By repeating the procedure, cuboidal test specimens for example with dimensions of 120 mm (length)×20 mm (width)×20 mm (height) were constructed. As soon as the complete "component" was printed, the powder bed was introduced into a furnace preheated to 140° C. and was held there for approximately 6 hours, the phenol resin having formed a fully cured and dimensionally stable green body. The excess silicon carbide powder was then sucked away after the cooling and removed from the green body.

Example 1 According to the Invention:

The green body based on silicon carbide produced by means of a 3D-printing method was subjected to an impregnation at negative pressure with a mixture containing a resol resin (phenol resin) with the trade name Norsophen 1203, 14 wt. % water as solvent and para-toluene sulfonic acid (50 wt. % solution in water) as curing agent. The curing agent content in this mixture was 3.0 wt. %. The content of curing agent in the above mixture is advantageously no greater than 10.0 wt. %, and the content of curing agent is more preferably between 1.0 and 6.0 wt. %, particularly preferably between 2.0 and 5.0 wt. %, in the above mixture. If the content of curing agent in this mixture is above 10.0 wt. %, there is no formation of a fine-pored, sponge-like carbon skeleton with the carbonisation of the cured resin system, and the pot life of the resin system for the impregnation treatment is too short. If the content of curing agent in the above mixture is much less than 1.0 wt. %, there is inadequate formation of a fine-pored sponge-like carbon skeleton, and the curing time is too long. If, by contrast, the content of curing agent in the above mixture is between 2.0 and 5.0 wt. %, with this content of binder there is a good formation of a fine-pored sponge-like carbon skeleton from the cured resin system after the carbonisation. At the same time, the pot life of the resin remains practicable.

Following this impregnation, a curing was performed at room temperature for at least 12 hours, before the cured green body was carbonised at 900° C. under a nitrogen atmosphere. A slow heating curve over 3 days at 900° C. was selected for the carbonisation treatment in order to prevent an explosion of the green body, brought about by the sudden evaporation of the solvent, that is to say water. This carbonised green body was then placed in a siliconisation furnace, with the green body having been placed on wicks. These wicks stand in a silicon powder bulk, with this bulk being located in turn in a coated graphite crucible. The furnace was then heated under vacuum to approximately 1600° C. The silicon powder in this case was liquid and rose purely by capillary action by means of the wicks into the 3D-printed, carbonised green body, without the need to apply any gas or liquid pressure in addition. Large parts of the sponge-like highly porous carbon formed as a result reacted with the liquid silicon and formed silicon carbide. Once the furnace had cooled, the ceramic components were taken out and the wicks mechanically removed. The obtained ceramic component had a content of free carbon of <1 wt. %, a content of free silicon of 24 wt. %, and a content of silicon carbide of 75 wt. %. The density was determined by means of the Archimedes method according to DIN 51918. Densities of the obtained ceramic component of 2.90 g/cm$^3$ and porosities of <1.0% were determined.

Example 2 According to the Invention:

The SiC green bodies were produced as per Example 1 according to the invention by means of 3D printing and, similarly to Example 1 according to the invention, were impregnated once with the resin system, cured and carbonised. The carbonisation was followed by renewed impregnation with the resin system, prior to curing at room temperature. The siliconisation was performed after the carbonisation under protective gas at 900° C. and was performed as described in Example 1 according to the invention. The obtained ceramic component had a content of free carbon of <1.0 wt. %, a content of free silicon of 15 wt. %, and a content of silicon carbide of 84 wt. %. The density was determined by means of the Archimedes method according to DIN 51918. Densities of the obtained ceramic component of 3.05 g/cm$^3$ and porosities of <0.1% were determined.

Example Not According to the Invention:

The green body based on silicon carbide produced by means of a 3D-printing method was subjected to a bath impregnation with a phenol resin. Following the stepped curing of the impregnated body under application of a temperature up to 160°, the body was carbonised and siliconised similarly to the examples according to the invention. The obtained ceramic component had a content of free carbon of 5 wt. %, a content of free silicon of 25 wt. %, and a content of silicon carbide of 70 wt. %. The density of the obtained ceramic component was 2.80 g/cm$^3$ and was determined by means of the Archimedes method according to DIN 51918.

Table 1 below specifies the properties of the produced ceramic components formed from 3D-printed silicon carbide in accordance with the examples not according to the invention and also the examples according to the invention. The specific values are mean values.

TABLE 1

| | Strength [MPa] | E-modulus [GPa] | Heat conductivity [W/m · K] | Universal hardness [MPa] |
|---|---|---|---|---|
| Example not according to the invention | 110 | 270 | 120 | 7500 |
| Example 1 according to the invention | 150 | 320 | 150 | 9000 |
| Example 2 according to the invention | 180 | 360 | 170 | 11000 |

The strength was determined in accordance with the 3-point flexural strength determination method according to DIN EN 843-1. The rigidity (E-modulus) was determined by means of the ultrasound method according to DIN EN 843-2. The heat conductivity at room temperature was determined in accordance with DIN 51908. The universal hardness was determined in accordance with DIN 50359-1.

As shown by the comparison of the examples, the strength and the rigidity (E-modulus) of the ceramic components according to the invention are higher than in the ceramic component according to the prior art. Due to the higher SiC fraction of 75 wt. % in the component as per Example 1 according to the invention as compared to an SiC fraction of 70 wt. % as per the Example not according to the invention, a significant increase in hardness of the ceramic component according to the invention (Example 1 according to the invention) to 9000 MPa in comparison to the ceramic component corresponding to the component not according to the invention (7500 MPa) was measured. An additional second impregnation as described in Example 2 according to the invention further increases the strengths and rigidities and also the hardness (see Table 1) on account of the even higher silicon carbide fraction in comparison to Example 1 according to the invention. The lower fraction of free silicon in Examples 1 and 2 (Example 1: 24 wt. %; example 2: 15 wt. %) of the ceramic component according to the invention will increase the temperature resistance and the chemical resistance of the component in comparison to components according to the prior art. The increasing SiC fraction of the ceramic components in Examples 1 (75 wt. %) and 2 (84 wt. %) according to the invention additionally leads to increasing thermal heat conductivities in comparison to the Example not according to the invention (see Table 1).

The invention claimed is:

1. A ceramic component containing silicon carbide (SiC) obtainable by a method comprising the following steps:
    a) providing a green body based on SiC, which has been produced by means of a 3D-printing method,
    b) impregnating the green body with a solution selected from the group consisting of a sugar solution, a starch solution or a cellulose solution, or a resin system comprising a mixture containing at least one resin, at least one solvent and at least one curing agent, the at least one resin and the at least one solvent being different,
    c) drying or curing the impregnated green body,
    d) carbonising the dried or cured green body, wherein a fine-pored, foam-like carbon skeleton is produced from the dried solution or a fine-pored, sponge-like carbon skeleton is produced from the cured resin system, and
    e) siliconising the carbonised green body by infiltrating with liquid silicon; wherein the obtained ceramic component contains 90 to 95 wt. % SiC, 2 to 9 wt. % free silicon and less than 1 wt. % free carbon, and the obtained ceramic component has a universal hardness of at least 8000 MPa.

2. The ceramic component according to claim 1, wherein in order to produce the green body an SiC powder having a grain size (d50) between 50 and 500 μm is used.

3. The ceramic component according to claim 1, wherein the at least one resin in step b) is a phenol resin, a furan resin, or any mixture of a phenol resin with a furan resin.

4. The ceramic component according to claim 1, wherein the at least one solvent is selected from the group consisting of water, a monovalent or polyvalent alcohol, a mixture of at least two of monovalent or polyvalent alcohols, a mixture of water with at least one monovalent and/or polyvalent alcohol or naphthalene.

5. The ceramic component according to claim 1, wherein the curing agent in step b) is an inorganic or organic acid.

6. The ceramic component according to claim 1, wherein the at least one solvent is replaced by at least one propellant.

7. The ceramic component according to claim 6, wherein the at least one resin is a two-component resin.

8. The ceramic component according to claim 1, wherein the curing in step c) is performed at room temperature or under application of a temperature which is lower than the boiling point of the at least one solvent.

9. The ceramic component according to claim 1, wherein the sponge-like carbon skeleton of the carbonised green body from step d) has a mean pore size of less than 50 μm.

10. The ceramic component according to claim 1, wherein, after the carbonising according to step d), the steps of the impregnation according to step b), of the curing according to step c), and of the carbonisation according to step d) are repeated at least once in the stated order, before the siliconisation according to step e) is performed.

11. The ceramic component according to claim 1, wherein the density of the component is greater than 2.85 g/cm$^3$.

12. The ceramic component according to claim 1, wherein the component has a heat conductivity of at least 80 W/(m·K).

13. The ceramic component according to claim 1, wherein the open porosity of the component is at most 1.0%.

14. A device comprising the component according to claim 1, wherein the device is selected from an impeller and separating or rotary vane in pumps and compressors, a pump housing, fittings in columns, static mixer elements, turbulators, an electrical heating element, an electrical contact, a classifier wheel, a heat exchanger or element for heat exchangers, heat sink in electronics, a cooling housing for light-emitting diodes and camera, highly rigid precise optical structures or measurement gauges, a sliding element in bearings or hinges comprising plan bearings and mechanical seals, a cam in transmissions, a gearwheel, a slide plate and a guide pipe of flexible shafts, a piston and piston sleeve, a lining element against wear and in corrosive applications, a friction element for clutches and brakes, a machining tool in the form of milling tools, drills, drill heads and indexable inserts, hot pressing tools and a device for ballistic protection.

15. The ceramic component according to claim 1, wherein the obtained ceramic component has a 3-point flexural strength of 120 MPa to 180 MPa.

* * * * *